(12) United States Patent  
Lee (10) Patent No.: US 12,261,706 B2  
(45) Date of Patent: Mar. 25, 2025

(54) DATA TRANSMISSION/RECEPTION DEVICE IN SEMICONDUCTOR SYSTEM FOR REDUCING CURRENT CONSUMPTION

(71) Applicant: FIDELIX CO., LTD., Seongnam-si (KR)

(72) Inventor: Jae Jin Lee, Gwangju-si (KR)

(73) Assignee: FIDELIX CO., LTD., Seongnam-si (KR)

( * ) Notice: Subject to any disclaimer, the term of this patent is extended or adjusted under 35 U.S.C. 154(b) by 52 days.

(21) Appl. No.: 18/313,771

(22) Filed: May 8, 2023

(65) Prior Publication Data

US 2024/0064034 A1   Feb. 22, 2024

(30) Foreign Application Priority Data

Aug. 19, 2022   (KR) .......................... 10-2022-0104059

(51) Int. Cl.
  *H04B 3/00*  (2006.01)
  *H04L 12/10*  (2006.01)
(52) U.S. Cl.
  CPC .................................. *H04L 12/10* (2013.01)

(58) Field of Classification Search
  CPC ........................................................ H04L 12/10
  USPC .................................. 375/257, 219, 295, 316
  See application file for complete search history.

(56) References Cited

U.S. PATENT DOCUMENTS

| 2003/0221038 A1* | 11/2003 | Yoo ...................... G06F 13/1678 |
| | | 710/305 |
| 2015/0120981 A1* | 4/2015 | D'Avignon ......... G06F 13/4063 |
| | | 710/305 |
| 2015/0229325 A1* | 8/2015 | Hollis ................. G06F 13/4221 |
| | | 710/106 |

* cited by examiner

*Primary Examiner* — Zewdu A Kassa  
(74) *Attorney, Agent, or Firm* — KILE PARK REED & HOUTTEMAN PLLC (57) ABSTRACT

A data transmission/reception device comprises a data bus; a data transmission circuit that recognizes standard data, receives a transmission data, loads a code data into the data bus, and generates a flag signal; and a data reception circuit that receives the flag signal and the code data transmitted through the data bus, and recovers the code data into a reception data according to the activation of the flag signal. According to the data transmission/reception device of the disclosure, current consumption may be reduced during data transmission.

12 Claims, 8 Drawing Sheets

| | BISD<1> | BISD<2> | BISD<3> | BISD<4> | BISD<5> | BISD<6> | BISD<7> | BISD<8> |
|---|---|---|---|---|---|---|---|---|
| CASE1 | 1 | 1 | 1 | 1 | 1 | 1 | 1 | 1 |
| CASE2 | 0 | 0 | 0 | 0 | 0 | 0 | 0 | 0 |
| CASE3 | 1 | 1 | 1 | 1 | 0 | 0 | 0 | 0 |
| CASE4 | 0 | 0 | 0 | 0 | 1 | 1 | 1 | 1 |

| | BICD<1> | BICD<2> | BICD<3> | BICD<4> |
|---|---|---|---|---|
| CASE1 | 1 | 0 | 0 | 0 |
| CASE2 | 0 | 1 | 0 | 0 |
| CASE3 | 0 | 0 | 1 | 0 |
| CASE4 | 0 | 0 | 0 | 1 |

DATA TRANSMISSION/RECEPTION DEVICE IN SEMICONDUCTOR SYSTEM FOR REDUCING CURRENT CONSUMPTION

CROSS-REFERENCE TO RELATED APPLICATION

This application claims priority to and the benefit of Korean Patent Application No. 2022-0104059 under 35 U.S.C. § 119, filed in the Korean Intellectual Property Office (KIPO) on Aug. 19, 2022, the disclosure of which is incorporated herein by reference in its entirety.

BACKGROUND

1. Technical Field

The disclosure relates to a data transmission/reception device, and more specifically, to a data transmission/reception device in semiconductor system for reducing current consumption.

2. Description of the Related Art

Semiconductor devices that transmit and receive data to and from each other are embedded in the semiconductor system. Also, a data transmission/reception device for transmitting/receiving data between semiconductor devices is implemented in the semiconductor system. Such a data transmission/reception device includes a data transmission circuit for transmitting data and a data reception circuit for receiving data. A data bus is formed between one semiconductor device including a data transmission circuit and another semiconductor device including a data reception circuit. Data is transmitted from the data transmission circuit to the data reception circuit through a data bus.

Data generally includes bit signals. Current is generally consumed in case that each of these bit signals is transmitted.

Semiconductor systems are becoming increasingly low in power. Accordingly, in a semiconductor system, it is very important to reduce current consumed during data transmission.

SUMMARY

The disclosure is directed to a data transmission/reception device in semiconductor system that reduces current consumption during data transmission.

According to an aspect of the disclosure, there is provided a data transmission/reception device in semiconductor system.

The data transmission/reception device according to an aspect of the disclosure comprises a data bus; a data transmission circuit that recognizes 1-st to m-th standard data, receives a transmission data including 1-st to n-th transmission bit signals, loads a code data including 1-st to p-th code bit signal into the data bus, and generates a flag signal, wherein at least one of the 1-st to p-th code bit signals is activated in case that the data value of the transmission data corresponds to any one of the 1-st to m-th standard data, and the flag signal is activated in case that the data value of the transmission data corresponds to any one of the 1-st to m-th standard data; and a data reception circuit that receives the flag signal and the code data transmitted through the data bus, and recovers the code data into a reception data according to activation of the flag signal, wherein the reception data includes 1-st to n-th reception bit signals, wherein 'm' is a natural number greater than or equal to 1, 'n' is a natural number greater than or equal to 2, and 'p' is a natural number less than 'n'.

The data transmission circuit may include a code generating part that is driven to activate at least one of the 1-st to p-th code bit signals of the code data corresponding to a data value of the transmission data in case that the data value of the transmission data corresponds to any one of the 1-st to m-th standard data; a flag generating part that generates the flag signal, the flag signal being activated according to activation of at least one of the 1-st to p-th code bit signals of the code data; and a transmission selecting part that is driven to load the code data into the data bus according to activation of the flag signal.

An i-th code bit signal of the code data may be activated as the data value of the transmission data corresponds to the data value of an i-th standard data, 'm' may be equal to 'p', and 'i' may be a natural number in a range of '1' to 'ID'.

The data bus may include 1-st to n-th data lines, the transmission selecting part may include 1-st to p-th transmission selecting subparts, and an i-th transmission selecting subpart may be driven to load the i-th transmission bit signal of the transmission data into an i-th data line according to inactivation of the flag signal, and load the i-th code bit signal of the code data into the i-th data line according to activation of the flag signal.

The data transmission circuit may further include a termination signal generating part that generates (p+1)-th to n-th termination signals, the transmission selecting part further including (p+1) to n-th transmission selecting subparts, a j-th transmission selecting subpart may be driven to load a j-th transmission bit signal of the transmission data into a j-th data line according to inactivation of the flag signal, and load the j-th signal of the code data into the j-th data line according to activation of the flag signal, and 'j' may be a natural number in a range of (p+1)' to 'n'.

The data reception circuit may include a recovery data generating part that receives the code data transmitted through the data bus in case that the flag signal is activated, and generates a recovery data including 1-st to n-th recovery bit signals, wherein activation of the 1-st to n-th recovery bit signals of the recovery data may be associated with activation of the 1-st to p-th code bit signal of the code data; and a reception selecting part that is driven to provide the 1-st to n-th recovery bit signals of the recovery data as the 1-st to n-th reception bit signals of the reception data according to activation of the flag signal.

The recovery data generating part may include 1-st to p-th recovery generating subparts, an i-th recovery generating subpart may be enabled in response to activation of the i-th code bit signal in case that the flag signal is in activate state, and control the data value of the recovery data to match the data value of the i-th standard data, 'm' may be equal to 'p', and i' may be a natural number in a range of '1' to 'ID'.

The i-th recovery generating subpart may include 1-st to n-th recovery bit generators, a k-th recovery bit generator may be driven to control a logic state of the k-th recovery bit signal of the recovery data to match a logic state of a k-th standard bit signal of the i-th standard data according to activation of the flag signal, and 'k' may be a natural number in a range of '1' to 'n'.

The k-th recovery bit generator of the i-th recovery generating subpart may include a latch block that latches a logic state of a k-th preliminary signal, wherein the logic state of the k-th preliminary signal may correspond to the logic state of the k-th standard bit signal of the i-th standard data; and a bit switch that controls a logical state of the k-th recovery bit signal of the recovery data to a logical state corresponding to the logical state of the k-th preliminary signal, wherein the logical state of the k-th preliminary signal may be latched by the latch block according to activation of the i-th code bit signal and the flag signal.

The k-th recovery bit generator of the i-th recovery generating subpart may further include an updating block that is capable of updating a logic state of the k-th preliminary signal latched in the latch block.

The reception selecting part may include 1-st to n-th reception selecting subparts, and a k-th reception selecting subpart may be driven to provide the k-th transmission bit signal of the transmission data transmitted through the k-th data line as a k-th reception bit signal of the reception data in case that the flag signal is deactivated, and may be driven to provide a k-th recovery bit signal of the recovery data as the k-th reception bit signal of the reception data in case that the flag signal is activated.

A semiconductor system to an aspect of the disclosure comprises a data transmission/reception device, the data transmission/reception device comprising a data bus; a data transmission circuit that recognizes 1-st to m-th standard data, receives a transmission data including 1-st to n-th transmission bit signals, loads a code data including 1-st to p-th code bit signals into the data bus, and generates a flag signal, wherein at least one of the 1-st to p-th code bit signals is activated in case that the data value of the transmission data corresponds to any one of the 1-st to m-th standard data, and the flag signal is activated in case that the data value of the transmission data corresponds to any one of the 1-st to m-th standard data, and a data reception circuit that receives the flag signal and the code data transmitted through the data bus, and recovers the code data into a reception data according to activation of the flag signal, wherein the reception data includes 1-st to n-th reception bit signals, wherein 'm' is a natural number greater than or equal to 1, 'n' is a natural number greater than or equal to 2, and 'p' is a natural number less than 'n'.

The data transmission circuit may include a code generating part that is driven to activate at least one of the 1-st to p-th code bit signals of the code data corresponding to a data value of the transmission data in case that the data value of the transmission data corresponds to any one of the 1-st to m-th standard data; a flag generating part that generates the flag signal, the flag signal being activated according to activation of at least one of the 1-st to p-th code bit signals of the code data; and a transmission selecting part that is driven to load the code data into the data bus according to activation of the flag signal.

An i-th code bit signal of the code data may be activated as the data value of the transmission data corresponds to the data value of an i-th standard data, 'm' may be equal to 'p', and 'i' may be a natural number in a range of '1' to 'ID'.

The data bus may include 1-st to n-th data lines, the transmission selecting part may include 1-st to p-th transmission selecting subparts, and an i-th transmission selecting subpart may be driven to load the i-th transmission bit signal of the transmission data into an i-th data line according to inactivation of the flag signal, and load the i-th code bit signal of the code data into the i-th data line according to activation of the flag signal.

The data transmission circuit may further include a termination signal generating part that generates (p+1)-th to n-th termination signals, the transmission selecting part further including (p+1) to n-th transmission selecting subparts, a j-th transmission selecting subpart may be driven to load a j-th transmission bit signal of the transmission data into a j-th data line according to inactivation of the flag signal, and load the j-th signal of the code data into the j-th data line according to activation of the flag signal, and 'j' may be a natural number in a range of (p+1)' to 'n'.

The data reception circuit may include a recovery data generating part that receives the code data transmitted through the data bus in case that the flag signal is activated, and generates a recovery data including 1-st to n-th recovery bit signals, wherein activation of the 1-st to n-th recovery bit signals of the recovery data may be associated with activation of the 1-st to p-th code bit signal of the code data; and a reception selecting part that is driven to provide the 1-st to n-th recovery bit signals of the recovery data as the 1-st to n-th reception bit signals of the reception data according to activation of the flag signal.

The recovery data generating part may include 1-st to p-th recovery generating subparts, an i-th recovery generating subpart may be enabled in response to activation of the i-th code bit signal in case that the flag signal is in activate state, and may control the data value of the recovery data to match the data value of the i-th standard data, 'm' may be equal to 'p', and i' may be a natural number in a range of '1' to 'ID'.

The i-th recovery generating subpart may include 1-st to n-th recovery bit generators, a k-th recovery bit generator may be driven to control a logic state of the k-th recovery bit signal of the recovery data to match a logic state of a k-th standard bit signal of the i-th standard data according to activation of the flag signal, and 'k' may be a natural number in a range of '1' to 'n'.

The k-th recovery bit generator of the i-th recovery generating subpart may include a latch block that latches a logic state of a k-th preliminary signal, wherein the logic state of the k-th preliminary signal may correspond to the logic state of the k-th standard bit signal of the i-th standard data; and a bit switch that controls a logical state of the k-th recovery bit signal of the recovery data to a logical state corresponding to the logical state of the k-th preliminary signal, wherein the logical state of the k-th preliminary signal may be latched by the latch block according to activation of the i-th code bit signal and the flag signal.

In the data transmission/reception device of the disclosure having the above configuration, the number of bit signals transmitted in data transmission is reduced. As a result, according to the data transmission/reception device of the disclosure, current consumption is reduced during data transmission.

BRIEF DESCRIPTION OF THE DRAWINGS

The above and other objects, features and advantages of the disclosure will become more apparent to those skilled in the art by describing in detail exemplary embodiments thereof with reference to the accompanying drawings, in which.

DETAILED DESCRIPTION OF THE EMBODIMENTS

Embodiments of the disclosure will be described in detail below with reference to the accompanying drawings. While the disclosure is shown and described in connection with embodiments thereof, it will be apparent to those skilled in the art that various modifications can be made without departing from the spirit and scope of the disclosure. Thus, the scope of the disclosure is not limited to the following embodiments.

The terminology used herein is for the purpose of describing embodiments only and is not intended to be limiting of the disclosure. As used herein, the singular forms, such as "a" and "an," are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, an embodiment of the disclosure will be described in detail with reference to the accompanying drawings.

Figure 1:
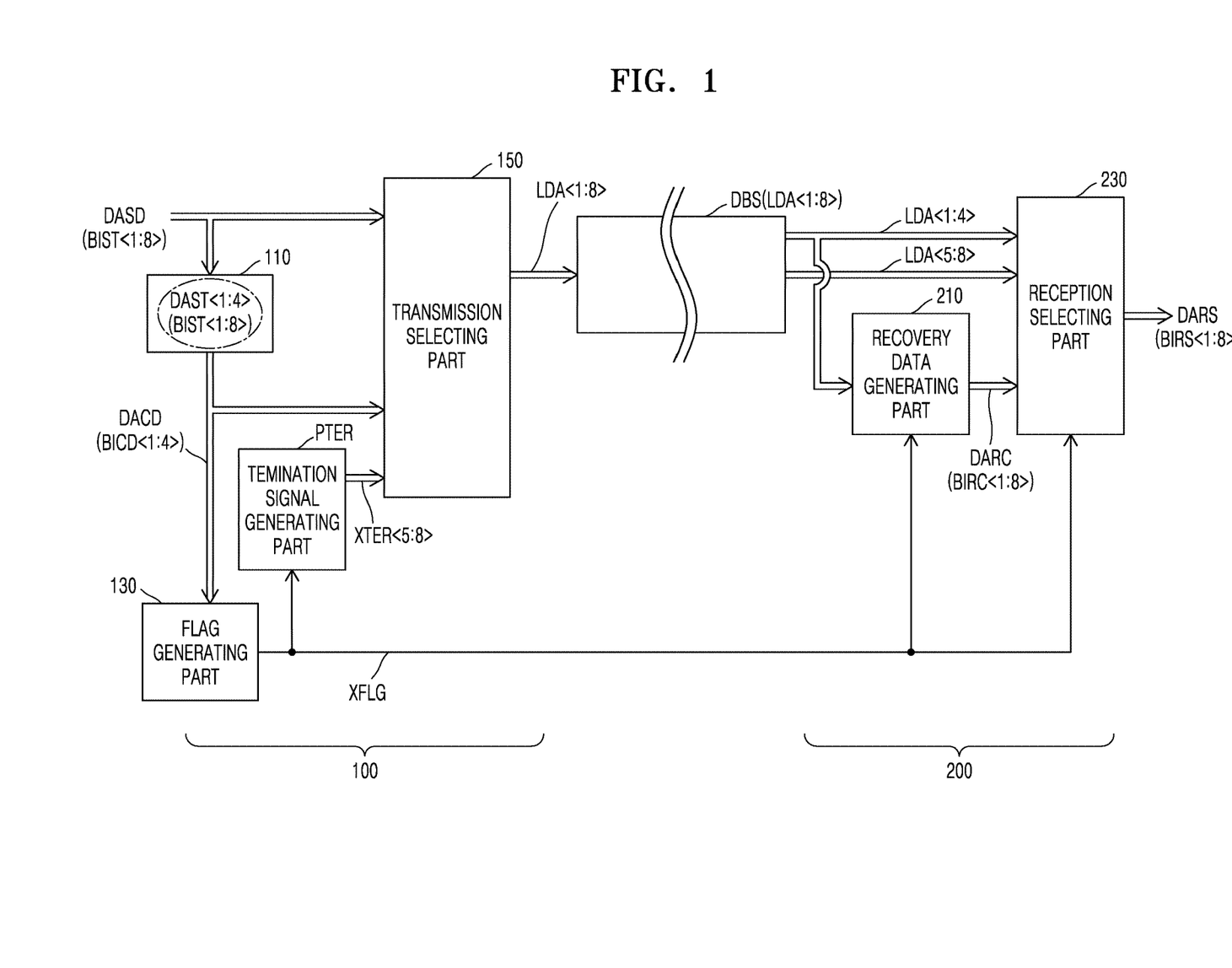
FIG. 1 is a schematic drawing illustrating a data transmission/reception device of a semiconductor memory system according to an embodiment of the disclosure.

FIG. 1 is a schematic drawing showing a data transmission/reception device of a semiconductor system according to an embodiment of the disclosure. Referring to FIG. 1, the data transmission/reception device of the embodiment may comprise a data bus DBS, a data transmission circuit 100, and a data reception circuit 200.

In this embodiment, the data bus DBS may include 1-st to n-th data lines LDA<1:n>. Here, 'n' may be a natural number greater than or equal to 2, and may be assumed to be '8' in this embodiment.

The data bus DBS may be a wire for mutual communication between a semiconductor device and an external chip (e.g., a controller). In this case, one of the data transmission circuit 100 and the data reception circuit 200 may be implemented inside the semiconductor device. The other one of the data transmission circuit 100 and the data reception circuit 200 may be implemented in an external chip.

The data transmission circuit 100 may recognize 1-st to m-th standard data DAST<1:m>, and receive a transmission data DASD. Here, 'm' is a natural number greater than or equal to 1, and is '4' in this embodiment. The transmission data DASD may include 1-st to n-th transmission bit signals BISD<1:8>. For example, the data value of the transmission data DASD may depend on or be associated with the logic states of the 1-st to 8-th transmission bit signals BISD<1:8>.

Each of the 1-st to 4-th standard data DAST<1:4> may include 1-st to 8-th standard bit signals BIST<1:8>. For example, the data value of each of the 1-st to 4-th standard data DAST<1:4> may depend on or be associated with the logic state of the 1-st to 8-th standard bit signals BIST<1:8>.

The data values of the 1-st to 4-th standard data DAST<1:4> may be set to data values of the transmission data DASD, which may be frequently used in the semiconductor device.

In this embodiment, the 1-st to 8-th standard bit signals BIST<1:8> of the 1-st standard data DAST<1> may be (1,1,1,1,1,1,1,1), the 1-st to 8-th standard bit signal BIST<1:8> of the 2-nd standard data DAST<2> may be (0,0,0,0,0,0,0,0), the 1-st to 8-th standard bit signal BIST<1:8> of the 3-rd standard data DAST<3> may be (1,1,1,1,0,0,0,0), and the 1-st to the 8-th standard bit signal BIST<1:8> of the 4-th standard data DAST<4> may be (0,0,0,0,1,1,1,1).

The data transmission circuit 100 may be driven to convert the transmission data DASD into a code data DACD, and load the code data DACD into the data bus DBS, in case that the data value of the transmission data DASD corresponds to any one of the 1-st to the 4-th standard data DAST<1:4>.

Here, the code data DACD may include 1-st to p-th code bit signals BICD<1:p>. For example, 'p' is a natural number smaller than 'n', and is '4' in this embodiment.

For example, in case that the data value of the transmission data DASD corresponds to any one of the 1-st to the 4-th standard data DAST<1:4>, at least one of the 1-st to the 4-th code bit signals BICD<1:4> may be activated.

The data transmission circuit 100 may be driven to generate a flag signal XFLG. In case that the data value of the transmission data DASD corresponds to any one of the 1-st to the 4-th standard data DAST<1:4>, the flag signal XFLG may be activated.

The data transmission circuit 100 may include a code generating part 110, a flag generating part 130, and a transmission selecting part 150, and may further include a termination signal generating part PTER.

The code generating part 110 may be driven to activate at least one of the 1-st to the 4-th code bit signals BICD<1:4> of the code data DACD corresponding to the data value of the transmission data DASD, in case that the data value of the transmission data DASD corresponds to any one of the 1-st to the 4-th standard data DAST<1:4>.

Figure 2:
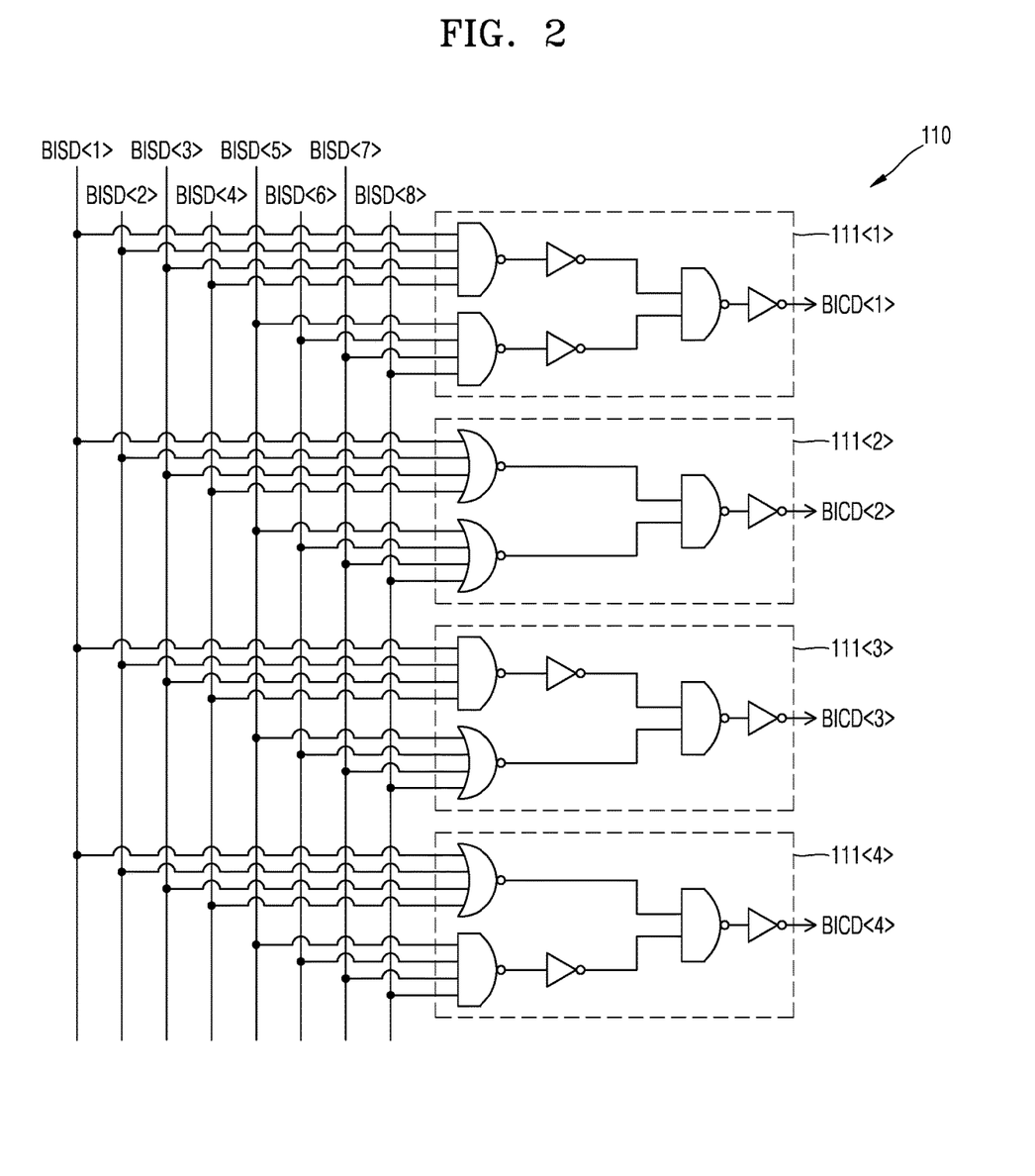
FIG. 2 is a schematic diagram of an equivalent circuit of an example of the code generating part of FIG. 1.
Figure 3:
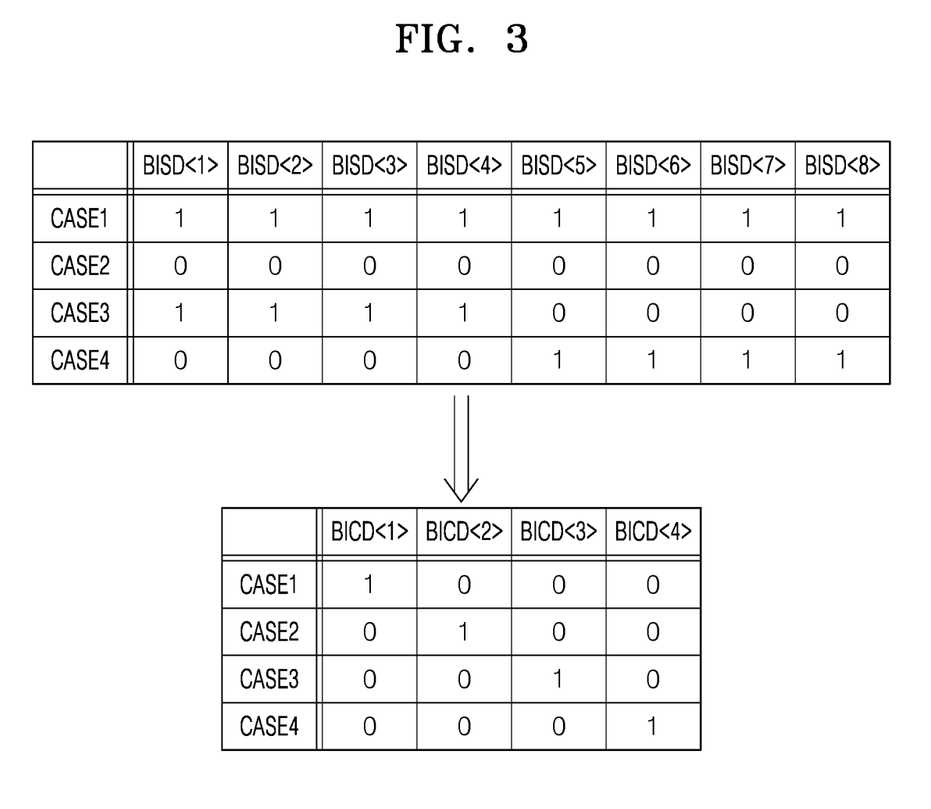
FIG. 3 is a schematic drawing for illustrating logic states of code bit signals of the code data generated from the code generating part of FIG. 2.

FIG. 2 is a schematic diagram of an equivalent circuit illustrating an example of the code generating part 110 of FIG. 1. FIG. 3 is a schematic drawing for illustrating logic states of the 1-st to the 4-th code bit signals BICD<1:4> of the code data DACD generated from the code generating part 110 of FIG. 2.

Referring to FIG. 2, the code generating part 110 may include a 1-st to a 4-th code bit generating part 111<1:4>.

The 1-st code bit generating part 111<1> may be driven to activate the 1-st code bit signal BICD<1> of the code data DACD, in case that the data value of the transmission data DASD is corresponding to the data value of the 1-st standard data DAST<1>.

In other words, in case that the 1-st to the 8-th transmission bit signals BISD<1:8> of the transmission data DASD are substantially equal to the 1-st to the 8-th standard bit signals BIST<1:8> of the 1-st standard data DAST<1>, for example, in case that the 1-st to the 8-th transmission bit signals BISD<1:8> of the transmission data DASD are (1,1,1,1,1,1,1,1), the 1-st code bit signal BICD<1> of the code data DACD may be activated as "H". See CASE 1 in FIG. 3. In this case, the 2-nd to the 4-th code bit signals BICD<2:4> of the code data DACD may be inactivated as "L".

The 2-nd code bit generating part 111<2> may be driven to activate the 2-nd code bit signal BICD<2> of the code data DACD, in case that the data value of the transmission data DASD is corresponding to the data value of the 2-nd standard data DAST<2>.

In other words, in case that the 1-st to the 8-th transmission bit signals BISD<1:8> of the transmission data DASD are substantially equal to the 1-st to the 8-th standard bit signal BIST<1:8> of the 2-nd standard data DAST<2>, for example, in case that the 1-st to the 8-th transmission bit signals BISD<1:8> of the transmission data DASD are (0,0,0,0,0,0,0,0), the 2-nd code bit signal BICD<2> of the code data DACD is activated as "H". See CASE 2 in FIG. 3. In this case, the 1-st code bit signal BICD<1> and the 3-rd to the 4-th code bit signals BICD<3:4> of the code data DACD may be inactivated as "L".

The 3-rd code bit generating part 111<3> may be driven to activate the 3-rd code bit signal BICD<3> of the code data DACD, in case that the data value of the transmission data DASD is corresponding to the data value of the 3-rd standard data DAST<3>.

In other words, in case that the 1-st to the 8-th transmission bit signals BISD<1:8> of the transmission data DASD are substantially equal to the 1-st to the 8-th standard bit signals BIST<1:8> of the 3-rd standard data DAST<3>, for example, in case that the 1-st to the 8-th transmission bit signal BISD<1:8> of the transmission data DASD are (1,1,1,1,0,0,0,0), the 3-rd code bit signal BICD<3> of the code data DACD may be activated as "H". See CASE 3 in FIG. 3. In this case, the 1-st to the 2-nd code bit signals BICD<1:2> and the 4-th code bit signal BICD<4> of the code data DACD may be inactivated as "L".

The 4-th code bit generating part 111<4> may be driven to activate the 4-th code bit signal BICD<4> of the code data DACD, in case that the data value of the transmission data DASD is corresponding to the data value of the 4-th standard data DAST<4>.

In other words, in case that the 1-st to the 8-th transmission bit signals BISD<1:8> of the transmission data DASD are substantially equal to the 1-st to the 8-th standard bit signal BIST<1:8> of the 4-th standard data DAST<4>, for example, in case that the 1-st to the 8-th transmission bit signals BISD<1:8> of the transmission data DASD are (0,0,0,0,1,1,1,1), the 4-th code bit signal BICD<4> of the code data DACD may be activated as "H". See CASE 4 in FIG. 3. In this case, the 1-st to the 3-rd code bit signals BICD<1:3> of the code data DACD may be inactivated as "L".

According to the code generating part 110 as described above, each of the 1-st to the 4-th code bit signals BICD<1:4> of the code data DACD may be activated, as the data values of the transmission data DASD correspond to the data values of the 1-st to the 4-th standard data DAST<1:4>.

Referring again to FIG. 1, the flag generating part 130 may generate the flag signal XFLG. The flag generating part may be implemented as (or include) at least one OR gate to perform OR operation on the 1-st to the 4-th code bit signals BICD<1:4> of the code data DACD to generate the flag signal XFLG.

The flag signal XFLG, which is generated from the flag generating part 130, may be activated to "H" according to activation of at least one of the 1-st to the 4-th code bit signals BICD<1:4> of the code data DACD.

For example, the flag signal XFLG may be activated to "H" as the data value of the transmission data DASD corresponds to any one of the 1-st to the 4-th standard data DAST<1:4>.

In this embodiment, the termination signal generating part PTER may generate 5-th to 8-th termination signals XTER<5:8>. The voltages of the 5-th to the 8-th end signals XTER<5:8> may correspond to the end voltages of the 5-th to the 8-th data lines LDA<5:8> of the data bus DBS.

For simplicity of description, a detailed description of the terminal signal generating part PTER is not provided in detail.

Referring again to FIG. 1, the transmission selecting part 150 may be driven to load the code data DACD into the data bus DBS according to activation of "H" of the flag signal XFLG. The transmission selecting part 150 may be driven to load the transmission data DASD into the data bus DBS according to inactivation of "L" of the flag signal XFLG.

Figure 4:
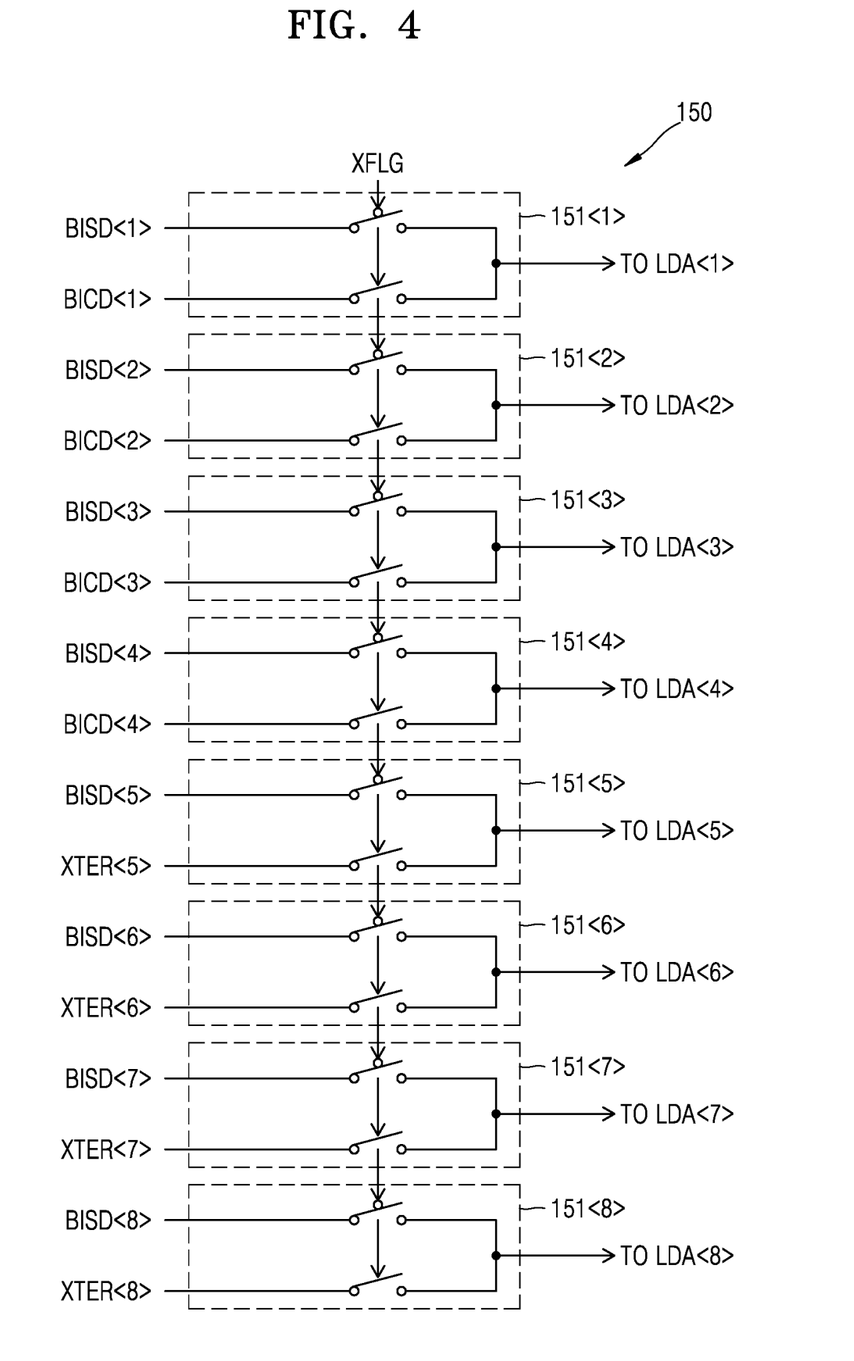
FIG. 4 is a schematic drawing illustrating the transmission selecting part of FIG. 1.

FIG. 4 is a schematic drawing illustrating the transmission selecting part 150 of FIG. 1. Referring to FIG. 4, the transmission selecting part 150 may include 1-st to 8-th transmission selecting subparts 151<1:8>.

In case that the flag signal XFLG is in the inactive state of "L", the 1-st to the 8-th transmission selecting subparts 151<1:8> may be driven to load the 1-st to the 8-th transmission bit signals BISD<1:8> of the transmission data DASD into the 1-st to the 8-th data line LDA<1:8> of the data bus DBS.

In case that the flag signal XFLG is in the active state of "H", the 1-st to the 4-th transmission selecting subparts 151<1:4> may be driven to load the 1-st to the 4-th code bit signal BICD<1:4> of the code data DACD into the 1-st to the 4-th data line LDA<1:4> of the data bus DBS.

In case that the flag signal XFLG is in the active state of "H", the 5-th to the 8-th data lines LDA<5:8> of the data bus DBS may be controlled to have voltages of the 5-th to the 8-th termination signals XTER<5:8>. In this case, voltages of the 5-th to the 8-th termination signal XTER<5:8> may be substantially equal to the termination voltages of the 5-th to the 8-th data lines LDA<5:8> of the data bus DBS. Accordingly, in the 5-th to the 8-th data lines LDA<5:8> of the data bus DBS, unnecessary transitions may be prevented during transferring of the code data DACD.

Referring again to FIG. 1, the data reception circuit 200 may receive the flag signal XFLG. The data reception circuit 200 may receive at least one of the transmission data DASD and the code data DACD, which is transmitted through the data bus DBS.

For example, in case that the flag signal XFLG is inactivated, the data reception circuit 200 may receive the transmission data DASD, which is transmitted through the data bus DBS. In case that the flag signal XFLG is activated, the data reception circuit 200 may receive the code data DACD, which is transmitted through the data bus DBS.

The data reception circuit 200 may include a recovery data generating part 210 and a reception selecting part 230.

The recovery data generating part 210 may receive the code data DACS transmitted through the data bus DBS in case that the flag signal XFLG is activated as "H", and may generate a recovery data DARC. The recovery data DARC may include 1-st to 8-th recovery bit signals BIRC<1:8>. For example, the data value of the recovery data DARC may depend on or be associated with the logic states of the 1-st to the 8-th recovery bit signals BIRC<1:8>.

Figure 5:
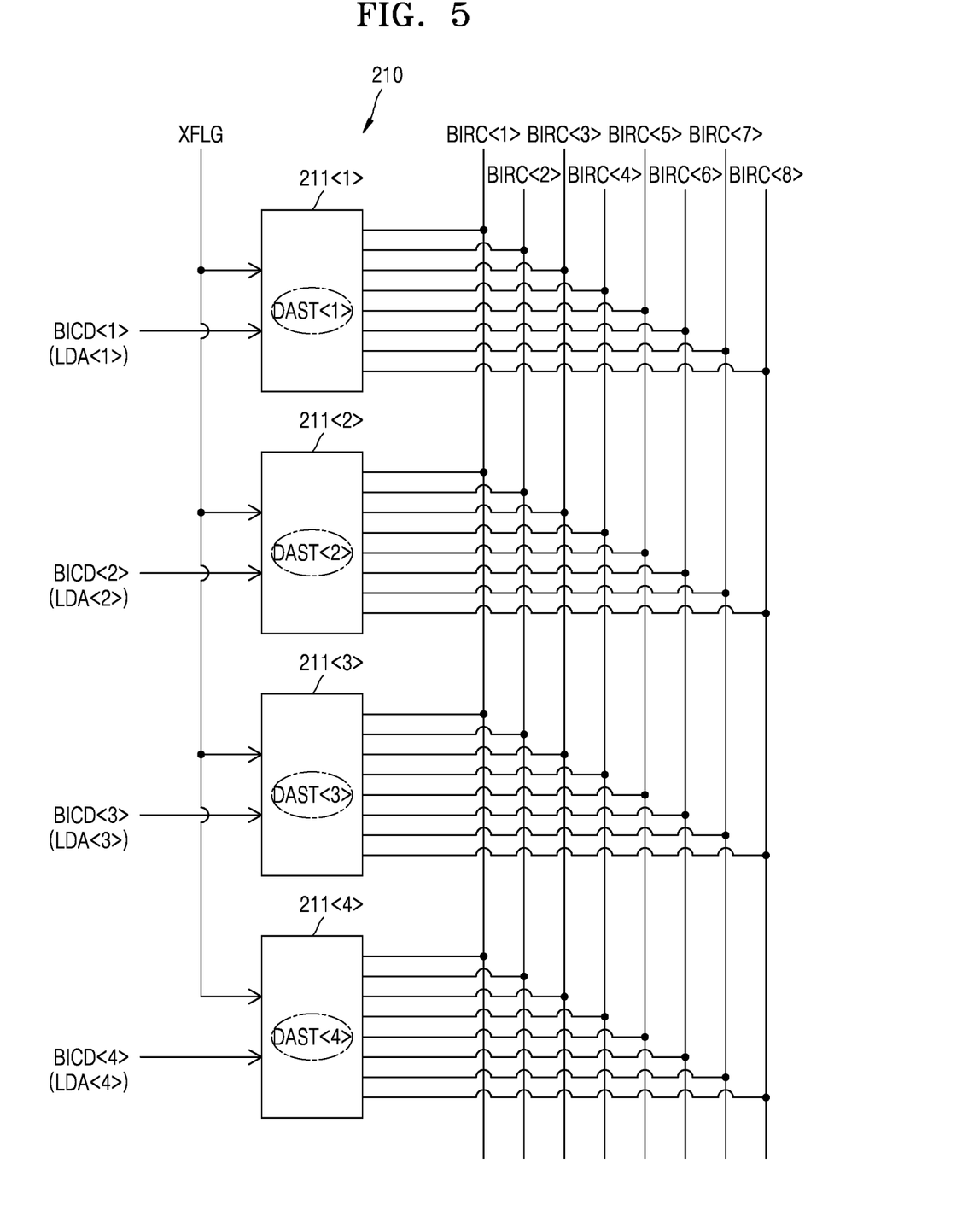
FIG. 5 is a schematic drawing illustrating the recovery data generating part of FIG. 1.

FIG. 5 is a schematic drawing illustrating the recovery data generating part 210 of FIG. 1. Referring to FIG. 5, the recovery data generating part 210 may include 1-st to 4-th recovery generating subparts 211<1:4>.

An i-th recovery generating subpart 211<i> may be enabled in response to activation of "H" of the i-th code bit signal BICD<i> in case that the flag signal XFLG is in activate state of "H". In this case, the i-th recovery generating subpart 211<i> may be driven to control the data value of the recovery data DARC to match the data value of the i-th standard data DAST<i>. Here, 'i' may be a natural number in a range of '1' to '4'.

Figure 6:
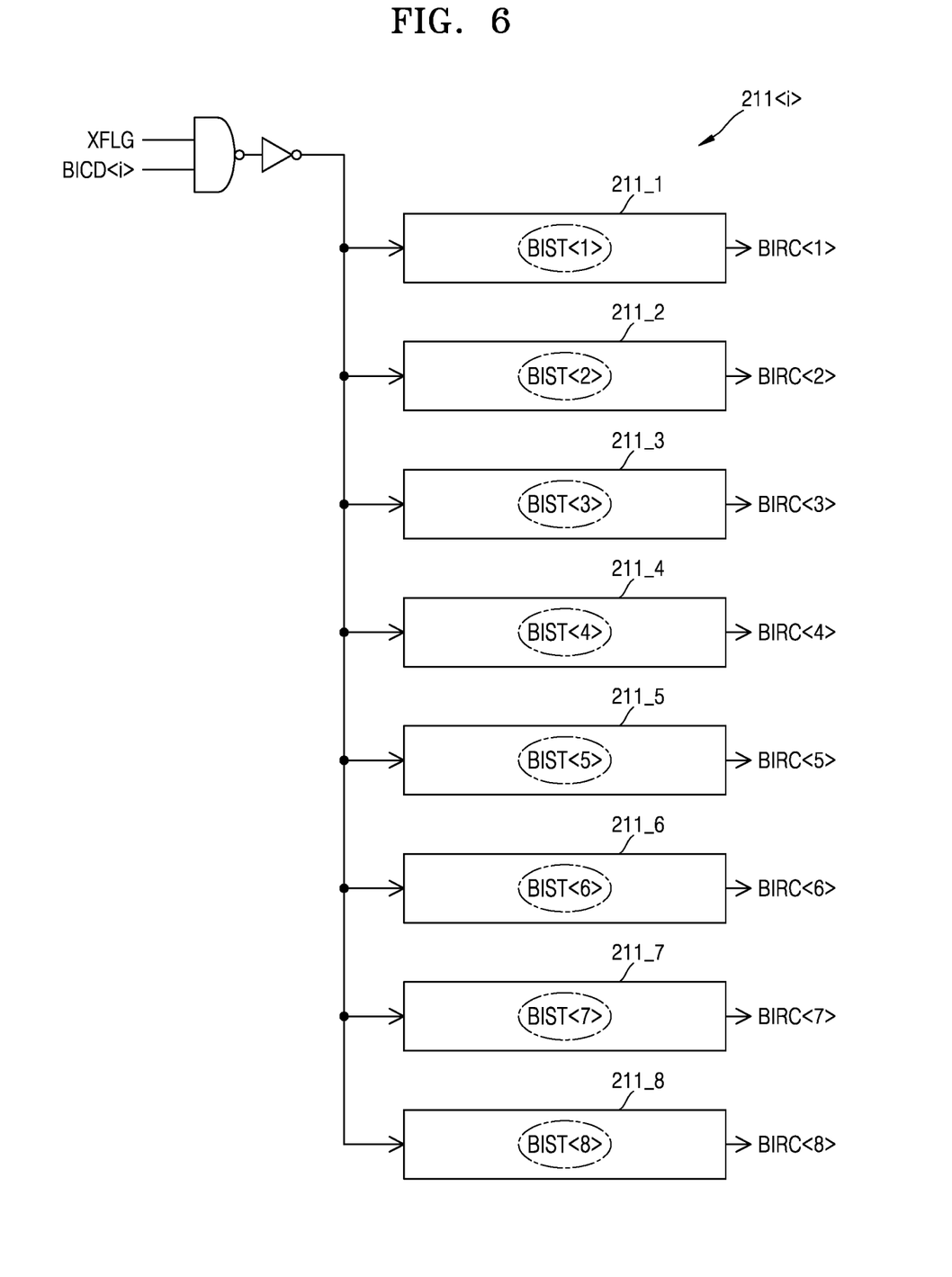
FIG. 6 is a schematic drawing illustrating one of the recovery generating subparts of FIG. 5.

FIG. 6 is a drawing showing the recovery generating subpart 211<i>, which is one of the 1-st to the 4-th recovery generating subparts 211<1:4> of FIG. 5. Referring to FIG. 6, the recovery generating subpart 211<i> includes 1-st to 8-th recovery bit generators (or generating means) 211_1 to 211_8.

A k-th recovery bit generator 211_k may be driven to control the logic state of the k-th recovery bit signal BIRC<k> of the recovery data DARC to match the logic state of the k-th standard bit signal BIST<k> of the i-th standard data DAST<i> according to the activation of "H" of the flag signal XFLG. Here, 'k' may be a natural number in a range of '1' to '8'.

Figure 7:
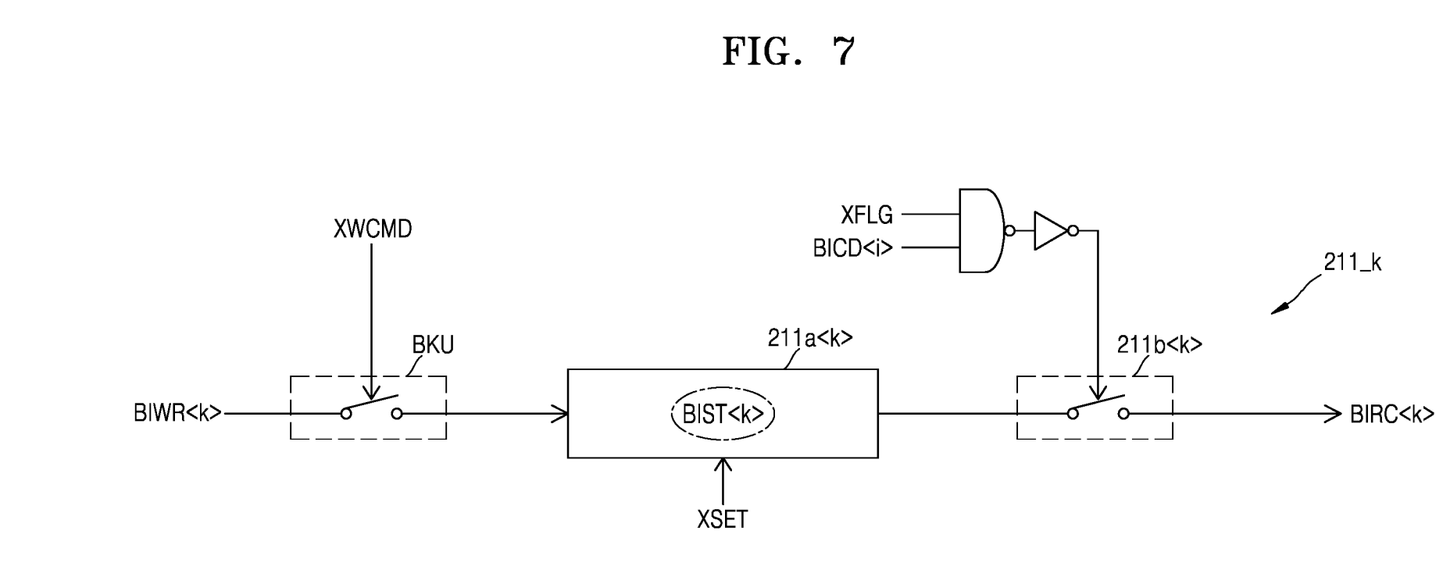
FIG. 7 is a drawing illustrating the k-th recovery bit generator of FIG. 6 in more detail.

FIG. 7 is a schematic drawing illustrating the k-th recovery bit generator 211_k of FIG. 6. Referring to FIG. 7, the k-th recovery bit generator 211_k of the i-th recovery generating subpart 211<i> may include a latch block 211a<k> and a bit switch 211b<k>, and may further include an updating block BKU. Here, 'k' may be a natural number in a range of '1' to '8'.

The latch block 211a<k> may be driven to latch the logic state of the k-th preliminary signal XPRE<k> in response to activation of the setting signal XSET. In this case, the logic state of the k-th preliminary signal XPRE<k> may be the same as that of the k-th standard bit signal BIST<k> of the i-th standard data DAST<i>.

The bit switch 211b<k> may be driven to control a logical state of the k-th recovery bit signal BIRC<k> of the recovery data DARC to the logical state of the k-th preliminary signal XPRE<k>. Here, the logical state of the k-th preliminary signal XPRE<k> may be the logic state, which is latched by the latch block 211a<k> according to the activation of "H" of the i-th code bit signal BICD<k> and the flag signal XFLG.

As a result, the activation of "H" of the 1-st to the 8-th recovery bit signals BIRC<1:8> of the recovery data DARC generated from the recovery data generating part 210 may depend on or be associate with the activation of the 1-st to the 4-th code bit signals BICD of the code data DACD.

In case that the write command signal XWCMD is activated, the updating block BKU receiving a bit writing signal BIWR is capable of updating a logic state of the k-th preliminary signal XPRE<k> which is latched in the latch block 211a<k>.

In this case, the logical state of the k-th preliminary signal XPRE<k> may be set to correspond to the standard data DAST of various data values set in the data transmission circuit 100.

For example, in case that the data value of the frequently used transmission data DASD is changed, the data value of the standard data DAST can be readily changed by the updating block BKU.

Referring again to FIG. 1, in case that the flag signal XFLG is activated as "H", the reception selecting part 230 may be driven to provide the 1-st to the 8-th recovery bit signals BIRC of the recovery data DARC as the 1-st to the 8-th reception bit signals BIRS<1:8> of the reception data DARS.

In case that the flag signal XFLG is activated as "H", the 1-st to the 8-th transmission bit signals BISD<1:8> of the transmission data DASD, which are transmitted through the data bus DBS, are provided as the 1-st to the 8-th reception bit signals BIRS<1:8> of the reception data DARS.

Accordingly, regardless of whether the flag signal XFLG is activated or not, the data value of the received data DARS represented by the logic state of the 1-st to the 8-th reception bit signals BIRS<1:8> may become substantially equal to the data value of the transmission data DASD.

Figure 8:
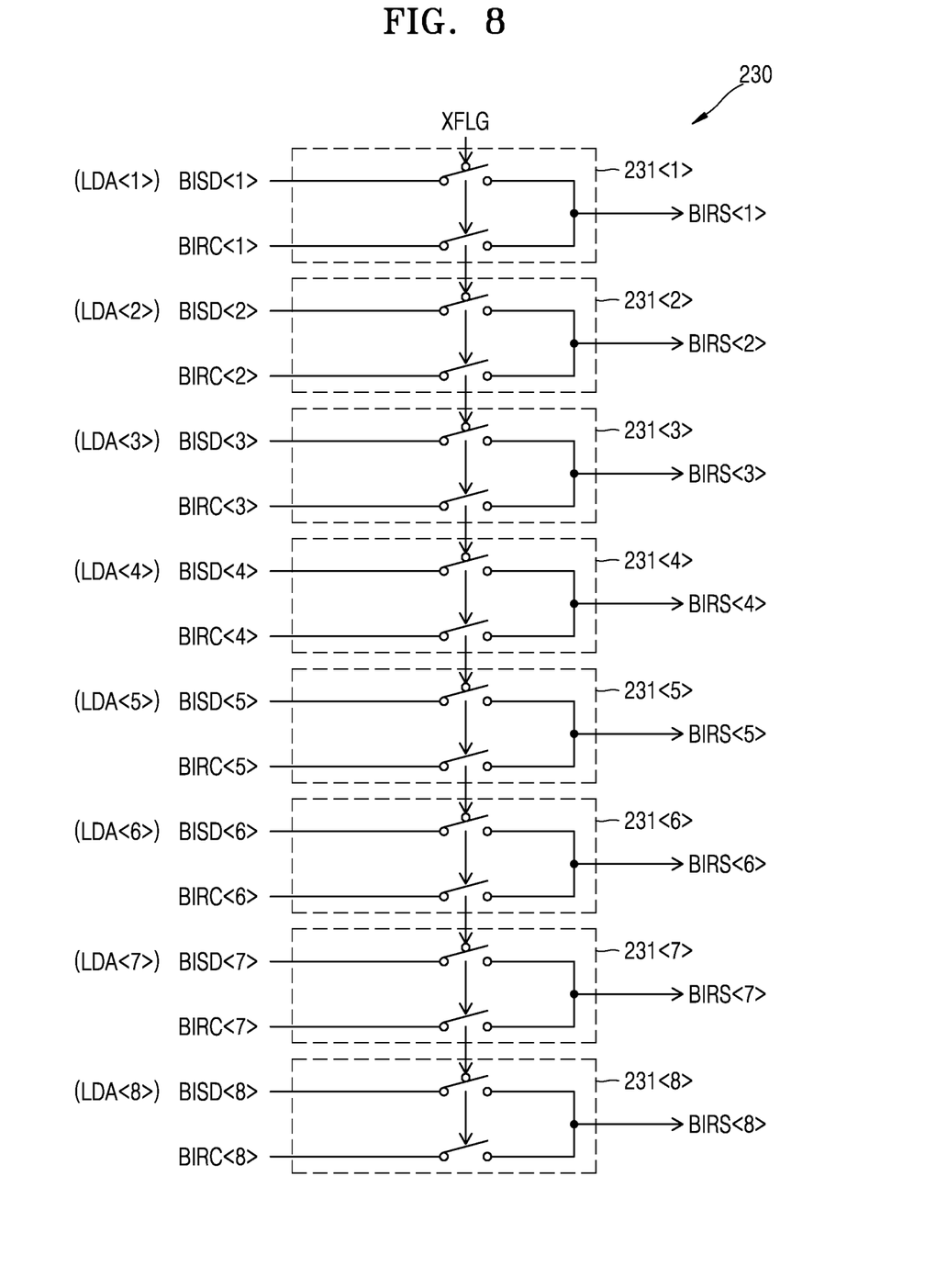
FIG. 8 is a drawing illustrating the reception selecting part of FIG. 1 in detail.

FIG. 8 is a schematic drawing illustrating the reception selecting part 230 of FIG. 1. Referring to FIG. 8, the reception selecting part 230 may include 1-st to 8-th reception selecting subparts 231<1:8>.

According to the deactivation of "L" of the flag signal XFLG, the 1-st to the 8-th reception selecting subparts 231<1:8> may be driven to provide the 1-st to the 8-th transmission bit signals BISD<1:8> of the transmission data DASD as the 1-st to the 8-th reception bit signals BIRS<1:8> of the reception data DARS. Here, the 1-st to the 8-th transmission bit signal BISD<1:8> of the transmission data DASD may be transmitted through the corresponding the 1-st to the 8-th data lines LDA<1:8>.

Also, in case that the flag signal XFLG is activated as "H", the 1-st to the 8-th reception selecting subparts 231<1:8> may be driven to provide the 1-st to the 8-th recovery bit signal BIRC<1:8> of the recovery data DARC as the 1-st to the 8-th reception bit signal BIRS<1:8> of the reception data DARS.

For example, in the data reception circuit 200 as described above, in case that the flag signal XFLG is activated to "H", the code data DACD may be recovered as the reception data DARS, which includes or consists of the 1-st to the 8-th reception bit signal BTRS<1:8>.

Accordingly, the data value of the reception data DARS may become substantially equal to the data value of the transmission data DASD.

In the data transmission/reception device of the disclosure as described above, in case that the data value of the transmission data DASD including a relatively large number of bit signals corresponds to the data value of the standard data DAST with a high frequency of use, the code data DACD including or consisting of relatively few bit signals may be generated in the data transmission circuit 100.

A relatively small number of bit signals of the code data DACD may be transmitted to the data reception circuit 200 through the data bus DBS.

As a result, according to the data transmission/reception device of the disclosure, current consumption may be remarkably reduced compared to the case where the transmission data is directly transmitted through a data bus.

While the disclosure has been described with reference to the embodiments shown in the drawings, these embodiments are merely illustrative and it should be understood that various modifications and other equivalent embodiments can be derived by those skilled in the art on the basis of the embodiments.

It will be apparent to those skilled in the art that various modifications can be made to the above-described exemplary embodiments of the disclosure without departing from the spirit or scope of the disclosure.

For example, in this specification, an embodiment in which the code bit signals of the code data are transmitted in parallel through each data line of the data bus has been shown and described. However, it is apparent to those skilled in the art that the technical concept of the disclosure can also be implemented by an embodiment in which the code bit signals of the code data are serially transmitted through the same data line of the data bus.

Also, in this specification, an embodiment in which the data transmission circuit and the data reception circuit are formed in different semiconductor devices has been shown and described. However, it is apparent to those skilled in the art that the technical idea of the disclosure may be implemented in an embodiment in which the data transmission circuit and the data reception circuit are formed in one single semiconductor device. In this case, the data bus may be understood as a wiring within one semiconductor device.

Thus, it is intended that the disclosure covers all such modifications provided they come within the scope of the disclosure and their equivalents.

What is claimed is:

1. A data transmission/reception device comprising:
a data bus;
a data transmission circuit that recognizes 1-st to m-th standard data, receives a transmission data including 1-st to n-th transmission bit signals, loads a code data including 1-st to p-th code bit signals into the data bus, and generates a flag signal, wherein at least one of the 1-st to p-th code bit signals is activated in case that the data value of the transmission data corresponds to any one of the 1-st to m-th standard data, and the flag signal is activated in case that the data value of the transmission data corresponds to any one of the 1-st to m-th standard data, and
a data reception circuit that receives the flag signal and the code data transmitted through the data bus, and recovers the code data into a reception data according to activation of the flag signal, wherein the reception data includes 1-st to n-th reception bit signals, wherein
'm' is a natural number greater than or equal to 1,
'n' is a natural number greater than or equal to 2,
'p' is a natural number less than 'n',
the data transmission circuit includes:
  a code generating part that is driven to activate at least one of the 1-st to p-th code bit signals of the code data corresponding to a data value of the transmission data in case that the data value of the transmission data corresponds to any one of the 1-st to m-th standard data;
  a flag generating part that generates the flag signal, the flag signal being activated according to activation of at least one of the 1-st to p-th code bit signals of the code data; and
  a transmission selecting part that is driven to load the code data into the data bus according to activation of the flag signal,
an i-th code bit signal of the code data is activated as the data value of the transmission data corresponds to the data value of an i-th standard data,
'm' is equal to 'p',
'i' is a natural number in a range of '1' to 'p'
the data bus includes 1-st to n-th data lines,
the transmission selecting part includes 1-st to p-th transmission selecting subparts,
an i-th transmission selecting subpart is driven to load the i-th transmission bit signal of the transmission data into an i-th data line according to inactivation of the flag signal, and load the i-th code bit signal of the code data into the i-th data line according to activation of the flag signal,
the data transmission circuit further includes a termination signal generating part that generates (p+1)-th to n-th termination signals, the transmission selecting part further including (p+1) to n-th transmission selecting subparts,
a j-th transmission selecting subpart is driven to load a j-th transmission bit signal of the transmission data into a i-th data line according to inactivation of the flag signal, and load the j-th signal of the code data into the j-th data line according to activation of the flag signal, and
'j' is a natural number in a range of '(p+1)' to 'n'.

2. The data transmission/reception device of claim 1, wherein the data reception circuit includes:
a recovery data generating part that receives the code data transmitted through the data bus in case that the flag signal is activated, and generates a recovery data including 1-st to n-th recovery bit signals, wherein activation of the 1-st to n-th recovery bit signals of the recovery data is associated with activation of the 1-st to p-th code bit signal of the code data; and a reception selecting part that is driven to provide the 1-st to n-th recovery bit signals of the recovery data as the 1-st to n-th reception bit signals of the reception data according to activation of the flag signal.

3. The data transmission/reception device of claim 2, wherein the recovery data generating part includes 1-st to p-th recovery generating subparts, an i-th recovery generating subpart is enabled in response to activation of the i-th code bit signal in case that the flag signal is in activate state, and controls the data value of the recovery data to match the data value of the i-th standard data, 'm' is equal to 'p', and 'i' is a natural number in a range of '1' to 'p'.

4. The data transmission/reception device of claim 3, wherein the i-th recovery generating subpart includes 1-st to n-th recovery bit generators, a k-th recovery bit generator is driven to control a logic state of the k-th recovery bit signal of the recovery data to match a logic state of a k-th standard bit signal of the i-th standard data according to activation of the flag signal, and 'k' is a natural number in a range of '1' to 'n'.

5. The data transmission/reception device of claim 4, wherein the k-th recovery bit generator of the i-th recovery generating subpart includes:

a latch block that latches a logic state of a k-th preliminary signal, wherein the logic state of the k-th preliminary signal corresponds to the logic state of the k-th standard bit signal of the i-th standard data; and a bit switch that controls a logical state of the k-th recovery bit signal of the recovery data to a logical state corresponding to the logical state of the k-th preliminary signal, wherein the logical state of the k-th preliminary signal is latched by the latch block according to activation of the i-th code bit signal and the flag signal.

6. The data transmission/reception device of claim 5, wherein the k-th recovery bit generator of the i-th recovery generating subpart further includes an updating block that is capable of updating a logic state of the k-th preliminary signal latched in the latch block.

7. The data transmission/reception device of claim 2, wherein the reception selecting part includes 1-st to n-th reception selecting subparts, and a k-th reception selecting subpart is driven to provide the k-th transmission bit signal of the transmission data transmitted through the k-th data line as a k-th reception bit signal of the reception data in case that the flag signal is deactivated, and is driven to provide a k-th recovery bit signal of the recovery data as the k-th reception bit signal of the reception data in case that the flag signal is activated.

8. A semiconductor system comprising:

a data transmission/reception device, the data transmission/reception device comprising:

a data bus;

a data transmission circuit that recognizes 1-st to m-th standard data, receives a transmission data including 1-st to n-th transmission bit signals, loads a code data including 1-st to p-th code bit signals into the data bus, and generates a flag signal, wherein at least one of the 1-st to p-th code bit signals is activated in case that the data value of the transmission data corresponds to any one of the 1-st to m-th standard data, and the flag signal is activated in case that the data value of the transmission data corresponds to any one of the 1-st to m-th standard data, and a data reception circuit that receives the flag signal and the code data transmitted through the data bus, and recovers the code data into a reception data according to activation of the flag signal, wherein the reception data includes 1-st to n-th reception bit signals, wherein 'm' is a natural number greater than or equal to 1, 'n' is a natural number greater than or equal to 2, 'p' is a natural number less than 'n', the data transmission circuit includes:

a code generating part that is driven to activate at least one of the 1-st to p-th code bit signals of the code data corresponding to a data value of the transmission data in case that the data value of the transmission data corresponds to any one of the 1-st to m-th standard data;

a flag generating part that generates the flag signal, the flag signal being activated according to activation of at least one of the 1-st to p-th code bit signals of the code data; and a transmission selecting part that is driven to load the code data into the data bus according to activation of the flag signal, an j-th code bit signal of the code data is activated as the data value of the transmission data corresponds to the data value of an i-th standard data, 'm' is equal to 'p', 'i' is a natural number in a range of '1' to 'p' the data bus includes 1-st to n-th data lines, the transmission selecting part includes 1-st to p-th transmission selecting subparts, an i-th transmission selecting subpart is driven to load the i-th transmission bit signal of the transmission data into an i-th data line according to inactivation of the flag signal, and load the i-th code bit signal of the code data into the i-th data line according to activation of the flag signal the data transmission circuit further includes a termination signal generating part that generates (p+1)-th to n-th termination signals, the transmission selecting part further including (p+1) to n-th transmission selecting subparts, a j-th transmission selecting subpart is driven to load a j-th transmission bit signal of the transmission data into a i-th data line according to inactivation of the flag signal, and load the j-th signal of the code data into the j-th data line according to activation of the flag signal, and 'j' is a natural number in a range of '(p+1)' to 'n'.

9. The semiconductor system of claim 8, wherein the data reception circuit includes:

a recovery data generating part that receives the code data transmitted through the data bus in case that the flag signal is activated, and generates a recovery data including 1-st to n-th recovery bit signals, wherein activation of the 1-st to n-th recovery bit signals of the recovery data is associated with activation of the 1-st to p-th code bit signal of the code data; and a reception selecting part that is driven to provide the 1-st to n-th recovery bit signals of the recovery data as the 1-st to n-th reception bit signals of the reception data according to activation of the flag signal.

10. The semiconductor system of claim 9, wherein
the recovery data generating part includes 1-st to p-th recovery generating subparts,
an i-th recovery generating subpart is enabled in response to activation of the i-th code bit signal in case that the flag signal is in activate state, and controls the data value of the recovery data to match the data value of the i-th standard data,
'm' is equal to 'p', and
'i' is a natural number in a range of '1' to 'p'.

11. The semiconductor system of claim 10, wherein
the i-th recovery generating subpart includes 1-st to n-th recovery bit generators,
a k-th recovery bit generator is driven to control a logic state of the k-th recovery bit signal of the recovery data to match a logic state of a k-th standard bit signal of the i-th standard data according to activation of the flag signal, and
'k' is a natural number in a range of '1' to 'n'.

12. The semiconductor system of claim 11, wherein
the k-th recovery bit generator of the i-th recovery generating subpart includes:
a latch block that latches a logic state of a k-th preliminary signal, wherein the logic state of the k-th preliminary signal corresponds to the logic state of the k-th standard bit signal of the i-th standard data; and
a bit switch that controls a logical state of the k-th recovery bit signal of the recovery data to a logical state corresponding to the logical state of the k-th preliminary signal, wherein the logical state of the k-th preliminary signal is latched by the latch block according to activation of the i-th code bit signal and the flag signal.

* * * * *